July 29, 1952  M. J. COHEN  2,605,345
MODULATOR

Filed Nov. 30, 1945  2 SHEETS—SHEET 1

INVENTOR
MARTIN J. COHEN

BY  M. O. Hayes

ATTORNEY

Patented July 29, 1952

2,605,345

UNITED STATES PATENT OFFICE 2,605,345

MODULATOR

Martin J. Cohen, Cambridge, Mass., assignor, by mesne assignments, to the United States of America as represented by the Secretary of the Navy Application November 30, 1945, Serial No. 631,949

14 Claims. (Cl. 177—380)

This invention relates to coded modulators, more particularly those producing, in response to each trigger pulse, a series of pulses spaced by predetermined time intervals, which series of pulses may be used to pulse an oscillator.

Navigational problems for both aircraft and ships are greatly simplified by the use of what are known in the art as radar beacons. Pulse transmissions from the air craft or ship excite the antenna of the transpondor, a pulse-type receiver-transmitter used to receive the interrogating pulse from the pulse-echo system and to transmit automatically an identifying reply pulse or pulses. Thus, transpondors located at appropriate ground sites immediately identify these positions to the navigator by information presented on the cathode ray tube of the pulse-echo system. To eliminate navigational errors caused by associating an identification with the wrong location on a chart of beacon transpondors, and to prevent misuse of the system, it is customary to code the transpondors reply. One type of coding known as range coding is commonly used. Each reply, caused by one interrogating pulse from the radar, consists of several pulses which will appear at different places on the range sweep. The range code may be produced by a number of multivibrators whose outputs are combined in a combining amplifier to produce a series of pulses. The series is then applied to a modulator, where the pulses are converted to high voltage pulses for energizing the transmitter. In adaptations where lightness and compactness are factors of importance, wherever a series of spaced pulses can be utilized, combining a coding circuit with a modulator would be desirable.

It is the object of the present invention to provide a circuit which combines the functions of a coder and modulator.

It is another object of the present invention to provide a circuit which will furnish a series of time spaced modulating pulses.

It is further the object of the present invention to provide a circuit which will furnish a series of time spaced modulating pulses, this time spacing being variable within predetermined limits.

The invention will be more clearly understood by reference to the following description, taken in connection with the accompanying drawings forming a part thereof, in which.

Figure 1:
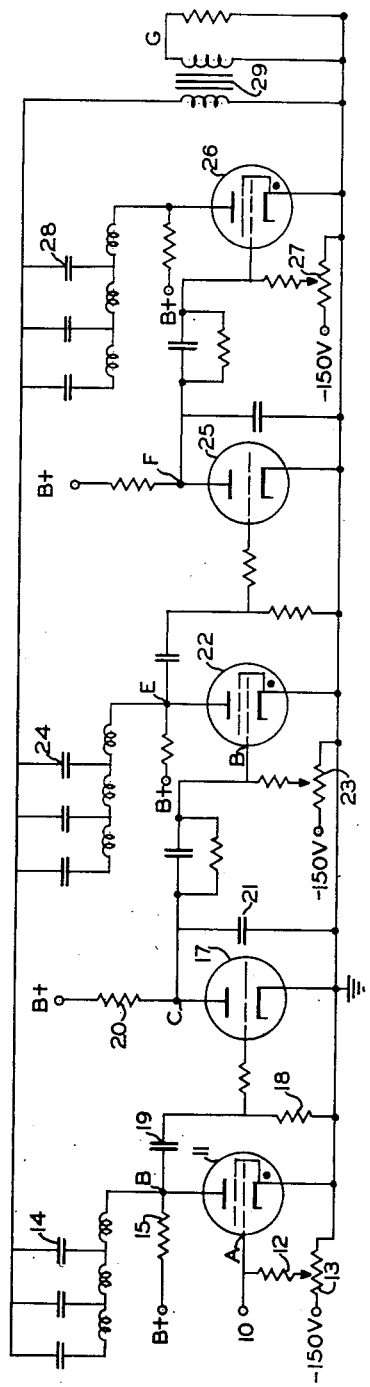
Fig. 1 is a schematic drawing of the coded modulator.
Figure 2:
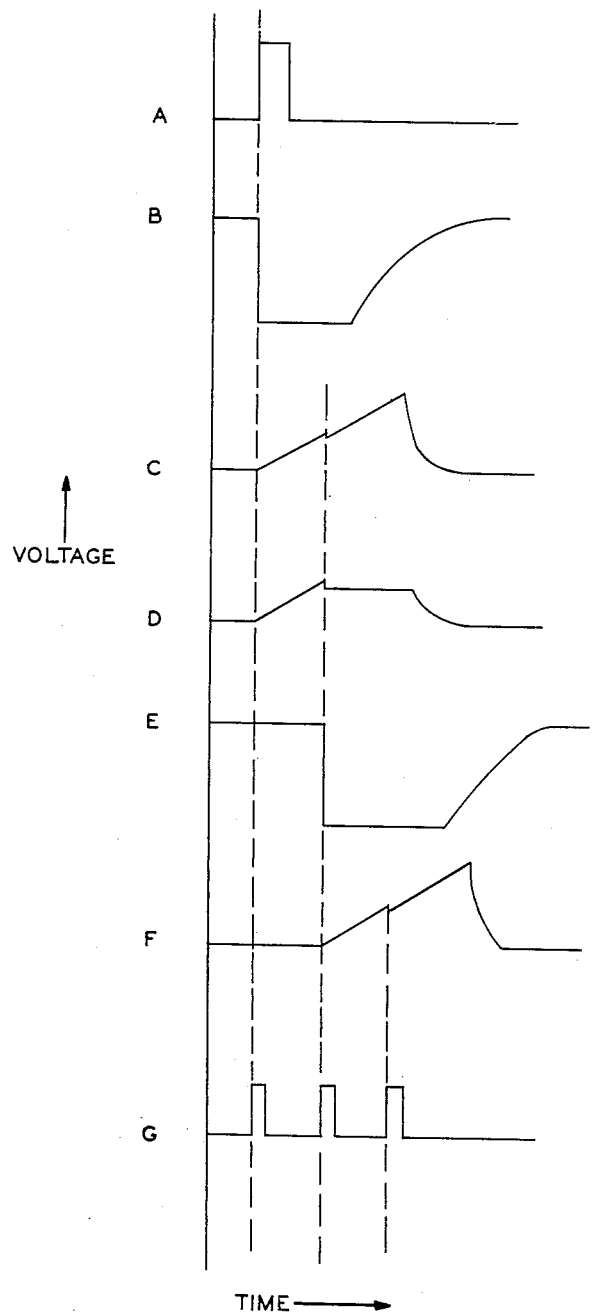
Fig. 2 is a representation of wave forms of voltage at specified parts of the circuits of Fig. 1.

Referring more particularly to the drawings, in the circuit as represented in Fig. 1, a positive initiating trigger, see A in Fig. 2, is fed to terminal 10 and applied to the control grid of Thyratron 11. A direct current return from grid to cathode of Thyratron 11 is through resistor 12 and potentiometer 13, the setting of potentiometer 13 determining the fixed bias on the grid. In between triggers pulse forming line 14 has charged through resistor 15. Upon application of the trigger to the grid of Thyratron 11, the tube fires and pulse forming line 14 discharges through the tube and the primary of pulse transformer 29, forming a pulse of predetermined width across the secondary of the pulse transformer. When Thyratron 11 fires, the voltage at its plate drops as represented in B of Fig. 2. The Thyratron continues in a conducting state for the duration of the initiating trigger assuming the trigger is of longer duration than the pulse from pulse forming line 14, and until such time afterwards as the grid regains control, at which time the plate potential of Thyratron 11 rises exponentially toward the plate voltage source. Conduction through triode 17 is cut off by the potential drop at the plate of Thyratron 11, and it remains cut off for a length of time dependent on the conduction time of Thyratron 11, on the time constant of charging of pulse forming line 14, and on the time constant of resistor 18 and condenser 19. When triode 17 becomes cut off, the potential at its plate starts to rise exponentially, as represented in C of Fig. 2, with a linearity and rate of rise which is determined primarily by the time constant of resistor 20 and condenser 21. The second Thyratron 22 has a cut off bias determined by the setting of potentiometer 23. The rising potential on the plate of triode 17 is applied to the grid of the second Thyratron 22 and fires the Thyratron at a time determined by the bias as set by potentiometer 23. It is apparent that triode 17 must remain cut off for a period of time in excess of the predetermined time spacing of the produced modulating pulses. A representation of the waveforms of voltage at the grid and plate of Thyratron 22 are shown as D and E of Fig. 2.

The firing of Thyratron tube 22 permits the discharge of pulse forming line 24 through the tube and the primary of pulse transformer 29, forming a pulse of predetermined width across the secondary of the pulse transformer. The time spacing of the pulses formed by the discharge of pulse forming lines 14 and 24 may be preset by potentiometer 23. The firing of Thyratron 22 causes a drop in its plate voltage. This drop in voltage cuts off triode 25 in a manner as heretofore described, and causes an exponential rise in plate voltage as represented by F of Fig. 2. This rising voltage fires Thyratron 26 at a time predetermined by the setting of potentiometer 27. The firing of the third Thyratron discharges pulse forming line 28 forming a third spaced pulse across the secondary of pulse transformer 29. The output of the coded modulator is shown by G of Fig. 2.

It is obvious that any number of spaced pulses may be formed in a manner similar to the above by utilizing the firing of the third Thyratron 26 to initiate a delay with the use of another hard tube triode, the amount of delay being preset by variance of the bias on the grid of a succeeding Thyratron. The firing of this succeeding Thyratron can similarly be used to generate a delay to fire another Thyratron, and so on in sequence.

Figure 3:
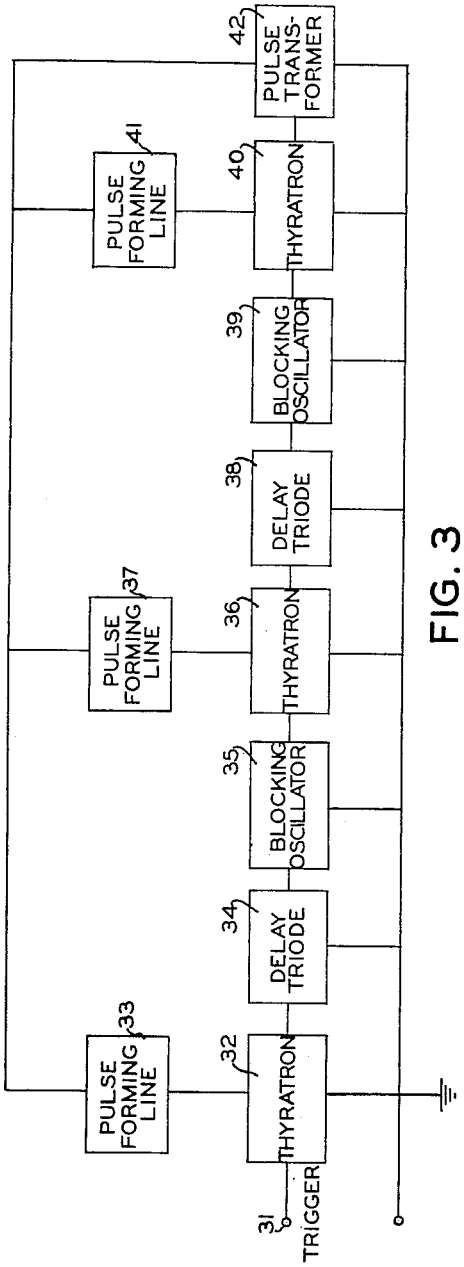
Fig. 3 is a drawing of a modified coded modulator which embodies a principle similar to the invention as portrayed in Fig. 1.

Another embodiment of this invention is explained with reference to Fig. 3. It was found that the reliability of the circuit with respect to latitude of code spacing and fixation of code spacing, commonly known in the art as "jitter," can be improved by using two hard tube triodes to generate the delay, one functioning as a delay triode and the other as a blocking oscillator.

A positive initiating trigger, applied to input terminal 31, fires Thyratron 32 thereby discharging pulse forming line 33 through the Thyratron and pulse transformer 42. The drop in voltage at the plate of Thyratron 32 cuts off hard tube triode 34. This tube starts conducting again after a delay which is determined by the time constant in its grid circuit, and by the magnitude of the voltage to which the resistor of this time constant circuit is returned. When tube 34 starts conducting, it generates a trigger that fires blocking oscillator 35. The blocking oscillator output trigger fires Thyratron 36, discharging pulse forming line 37 through Thyratron 36 and pulse transformer 42 and so producing the second spaced modulator pulse. The firing of Thyratron 36 cuts off triode 38. When triode 38 starts conducting again it generates a trigger which fires blocking oscillator 39 which in turn fires the succeeding Thyratron 40. Thyratron 40 discharges pulse forming line 41 through pulse transformer 42, thus producing the third coded pulse.

It is obvious that any number of spaced pulses may be formed in a manner similar to the above by utilizing a Thyratron to initiate a delay by cutting off a hard tube triode. When the triode starts conducting it generates a trigger which fires a blocking oscillator, the output of which fires another Thyratron, discharging a pulse forming line, and so on in sequence.

The invention is only to be limited by the appended claims.

What is claimed is:

1. A coded modulator comprising, a plurality of means each producing a modulating pulse in response to an input trigger, a load, said plurality of pulse producing means being connected across said load, a means connected with the output of each of said plurality of pulse producing means less one for triggering a subsequent pulse producing means at a predetermined time from the occurrence of the modulating pulse in the corresponding connected pulse producing means, whereby a series of modulating pulses will be impressed on said load.

2. A coded modulator comprising, a plurality of networks in parallel, a load connected across said networks, each network including a Thyratron and a pulse forming line in series, a source of voltage across each Thyratron to charge the corresponding pulse forming line through said load, a circuit connecting adjacent networks for producing, in response to the firing of the Thyratron across which output said circuit is connected, a voltage which fires, after a predetermined delay, the Thyratron across whose input said circuit is connected, said Thyratrons being normally non-conducting, the first of said Thyratrons becoming conducting in response to a trigger applied to its grid to permit the pulse forming line in series therewith to discharge through said load and to initiate the firing by said circuit, after said predetermined delay, of the succeeding Thyratron to discharge the pulse forming line in series therewith through said load.

3. A coded modulator comprising, a plurality of networks in parallel, a load connected across said networks, each network including a Thyratron and a pulse forming line in series, a source of voltage across each Thyratron to charge the corresponding pulse forming line through said load, a circuit connecting adjacent networks for producing, in response to an input pulse, a voltage having a rising characteristic, said Thyratrons being normally non-conducting, the first of said Thyratrons becoming conducting in response to a trigger applied to its grid to permit the pulse forming line in series therewith to discharge through said load and to impress a pulse on said circuit to produce therein the voltage of rising characteristic which upon reaching a predetermined magnitude will render the succeeding Thyratron conducting, to discharge the pulse forming line in series therewith through said load.

4. The combination of claim 3, wherein said circuit comprises a delay triode and blocking oscillator in series for generating a delay trigger, said trigger, after said predetermined delay, rendering the succeeding Thyratron conducting.

5. A coded modulator comprising a plurality of networks, each network comprising a two-terminal pulse-forming line, and a trigger operated switch means having one terminal thereof connected to one terminal of said pulse-forming line, a load, a second terminal of each of said pulse-forming lines being connected to one terminal of said load and a second terminal of each of said switch means being connected to a second terminal of said load, means associated with each of said networks for charging said pulse-forming lines, means for applying a trigger to the first of said switch means whereby the pulse-forming line associated with said switch means is caused to discharge through said load, and delay means interposed between successive networks, each delay means being adapted to trigger the switch means in the succeeding network a predetermined time after the discharge of the pulse-forming line in the preceding network whereby said pulse-forming lines are discharged in succession through said load.

6. A coded modulator comprising a plurality of pulse-forming networks, means for charging each of said networks, a discharge circuit for each of said networks comprising a trigger-operated switch means and an impedance, said impedance being common to all of said discharge circuits, a plurality of delay means connecting successive switch means to form a series of alternate switch means and delay means, and means for applying a trigger to the first switch means in said series whereby said networks may be caused to discharge is succession through said common impedance at intervals determined by said delay means.

7. A coded modulator as recited in claim 6 wherein said delay means are individually adjustable whereby the time-spacing between successive discharges of said pulse-forming lines may be varied.

8. A coded modulator comprising a plurality of pulse-forming networks, means for charging each of said networks, a discharge circuit for each of said networks comprising a trigger-operated electron tube switch means and an impedance, said impedance being common to all of said discharge circuits, a plurality of delay means connecting successive switch means to form a series of alternate switch means and delay means, each of said delay means being adapted to provide a trigger a predetermined time after the switch means preceding it in said series is operated, and means for applying a trigger to the first switch means in said series whereby said networks may be caused to discharge in succession through said comon impedance at intervals determined by said delay means.

9. A coded modulator as recited in claim 8 wherein each of said delay means comprises a sawtooth generator and a blocking oscillator in series for generating a delayed trigger.

10. A coded modulator comprising a plurality of series circuits each including a pulse-forming network, a switch means, and an impedance, said impedance being common to all said series circuits, means for charging said pulse-forming networks and means for operating said switch means in a predetermined succession whereby the signal appearing across said impedance is a series of voltage pulses spaced apart in time.

11. A coded modulator comprising a plurality of series circuits each including a pulse-forming network having predetermined characteristics, a switch tube, and an impedance, said impedance being common to all said series circuits, means for charging said pulse-forming networks, delay means having predetermined characteristics connecting successive switch tubes whereby said switch tubes are caused to operate in succession upon operation of one of said switch tubes, the signal appearing across said impedance comprising a series of voltage pulses having pulse widths determined by the characteristics of the respective networks and having time-spacings determined by the characteristics of said delay means.

12. A coded modulator comprising, a plurality of pulse-forming networks, a load, a like plurality of switching means for discharging each of said networks in spaced succession through said load, and means for varying the times of operation of each of said switching means.

13. A coded modulator comprising, a plurality of pulse-forming networks, a load, a like plurality of switch tubes for discharging each of said networks successively through said load, and means for varying the bias of each of said switch tubes to independently vary the respective times of operation thereof.

14. A coded modulator comprising, a plurality of pulse-forming networks, a load, a like plurality of switch tubes, each associated with a respective pulse-forming network, means for normally biasing each of said switch tubes below cutoff, means for independently varying the normal bias on each of said switch tubes, means for triggering one of said switch tubes for initiating discharge of one of said pulse-forming networks through said load and its associated switch tube, and means responsive to the discharge of said one of said pulse-forming networks for successively initiating discharge of each of the remainder of said plurality of pulse-forming networks through its associated switch tube and said load.

MARTIN J. COHEN.

REFERENCES CITED

The following references are of record in the file of this patent:

UNITED STATES PATENTS

| Number | Name | Date |
| --- | --- | --- |
| 2,076,335 | Dallenbach | Apr. 6, 1937 |
| 2,277,000 | Bingley | Mar. 17, 1942 |
| 2,403,561 | Smith | July 9, 1946 |
| 2,409,229 | Smith et al. | Oct. 15, 1946 |
| 2,415,093 | Gerwin | Feb. 4, 1947 |
| 2,421,606 | Fitch | June 3, 1947 |